United States Patent [19]

Rilling

[11] Patent Number: 5,058,525
[45] Date of Patent: Oct. 22, 1991

[54] DIAL TAMPERING DETECTOR

[75] Inventor: John F. Rilling, Norcross, Ga.

[73] Assignee: Universal Protection Corporation, Norcross, Ga.

[21] Appl. No.: 555,045

[22] Filed: Jul. 19, 1990

[51] Int. Cl.$^5$ .................. G01D 13/00; G09F 11/02
[52] U.S. Cl. .................. 116/284; 116/200; 116/300; 324/110
[58] Field of Search ............. 324/110; 116/200, 284, 116/298, 300

[56] References Cited

U.S. PATENT DOCUMENTS

| | | | |
|---|---|---|---|
| 4,490,672 | 12/1984 | Signorelli | 324/110 |
| 4,588,949 | 5/1986 | Becker et al. | 324/110 |
| 4,749,938 | 6/1988 | Bishop | 324/110 |

FOREIGN PATENT DOCUMENTS

| | | | |
|---|---|---|---|
| 0124434 | 11/1984 | European Pat. Off. | 324/110 |
| 2221993 | 2/1990 | United Kingdom | 324/110 |

*Primary Examiner*—Allan N. Shoap
*Assistant Examiner*—W. Morris Worth
*Attorney, Agent, or Firm*—Trexler, Bushnell, Giangiorgi & Blackstone, Ltd.

[57] ABSTRACT

A method for detecting tampering with a dial of a utility meter is used with a meter of the type including at least one rotary dial having angularly spaced circumferentially arrayed indicia and an indicator, the indicator and said indicia being relatively rotatable by a gear train having at least one gear which rotates in unison with the dial in operation. The method includes emcoding the gear with a code which corresponds in a predetermined fashion with the indicia of the dial and anotating on the meter a predetermined key to the initial correspondence of the code with the relative position of the dial indicator. The invention extends to an apparatus for carrying out the foregoing method.

16 Claims, 4 Drawing Sheets

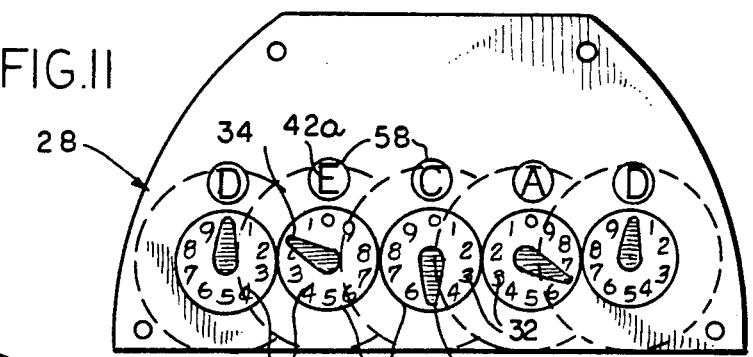
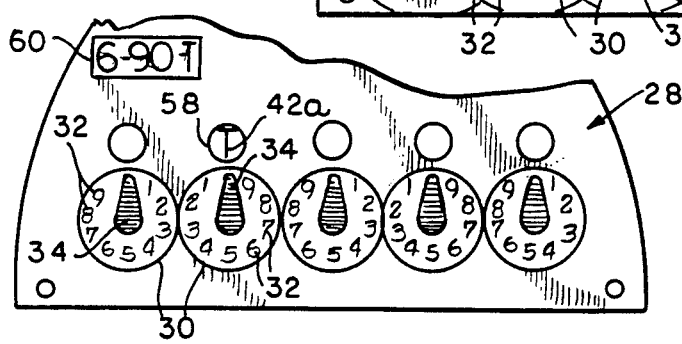
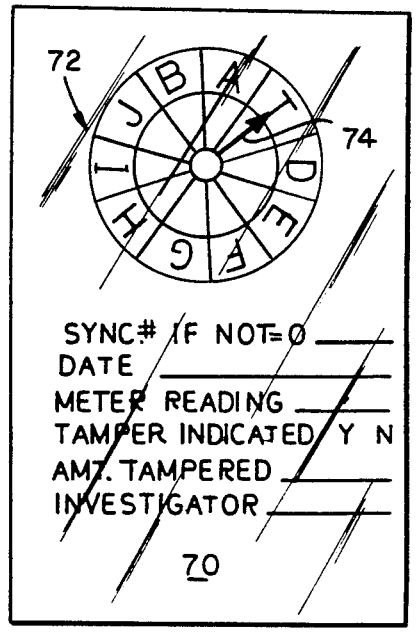
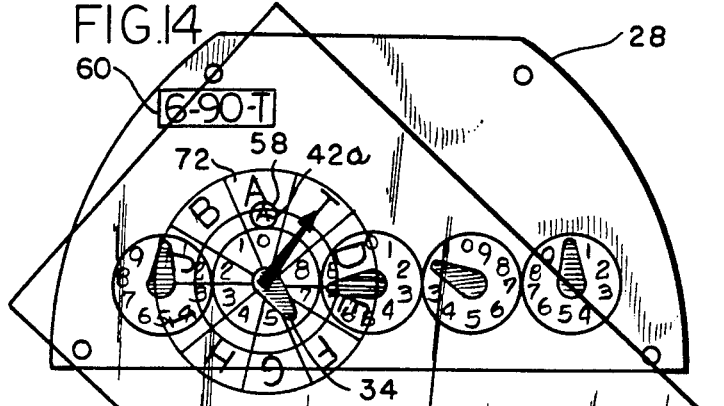
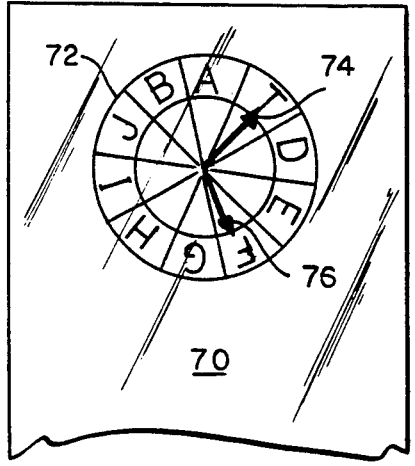

DIAL TAMPERING DETECTOR

BACKGROUND OF THE INVENTION

The present invention is directed to a novel method and apparatus for detecting tampering with a dial, such as the dial of a utility meter or the like.

While the invention may find other useful applications, the following description will be facilitated by specific reference to the problem of detecting tampering with a utility meter and particularly with a kilowatt hour meter. Generally speaking, currently manufactured kilowatt hour meters have registers consisting of a plurality of rotary dials having angularly arrayed numerical indicia on their faces and indicators in the form of pointers which are set to rotate on centrally located shafts within each dial or register. Each of these indicators or pointers is mounted to its shaft which is in turn driven by a corresponding gear of a gear train, the gear train being arranged to drive the respective pointers to indicate successive powers of 10 of the kilowatt hours used. Hence, a first dial and pointer indicate the kilowatt hours, a second dial, tens of kilowatt hours, etc.

The pointers of these meters are generally fitted to their shafts only in a friction fit to normally rotate in unison with the shafts. However, the pointers can be manually reset to zero without actually running the gear train to zero, which latter exercise is very time consuming. Accordingly, the utility or other authorized persons can reset all of the pointers to zero manually, for example, when the meter is being prepared for a new service connection.

Unfortunately, many consumers have learned of this feature and have used it to manually move the pointers back in an unauthorized attempt to reduce their apparent energy consumption. While the meters are generally provided with some sort of locking device or other anti-tampering seal to normally prohibit undetected access to the meter dials, consumers often deny knowledge of the source of breakage of such a locking or sealing device. Hence, the utility has no way of determining the existence of tampering or the amount of tampering with the dial with any degree of accuracy. At best, the utility must rely on records of prior usage in an attempt to determine whether there has been tampering and to attempt to arrive at some estimate of the amount of tampering, if any.

OBJECTS AND SUMMARY OF THE INVENTION

Accordingly, it is a general object of the invention to provide a method and apparatus for detecting tampering with the dial of a utility meter.

A more particular object is to provide a dial tampering detection method and apparatus which is capable of providing a reasonably accurate determination of not only the existence of tampering but also of the amount of tampering; i.e., the amount by which the apparent energy consumption has been reduced as compared to the actual energy consumption, based upon the amount of movement of the dial which has occurred during dial tampering.

A related object is to provide a method and apparatus in accordance with the foregoing objects which may be relatively simply and inexpensively applied to both existing meters and also employed in the manufacture of meters for later use in the field.

Briefly, and in accordance with the foregoing objects, a method for detecting tampering with a dial of a utility meter is used with a meter of the type including at least one rotary dial having angularly spaced circumferentially arrayed indicia and an indicator, said indicator and said indicia being relatively rotatable by a gear train having at least one gear which rotates in unison with the dial in operation. The method includes encoding the gear with a code which corresponds in a predetermined fashion with the indicia of the dial and annotating on the meter a predetermined key to the initial correspondence of the code with the relative position of the dial indicator. The invention extends to an apparatus for carrying out the foregoing method.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawing in which like reference numerals identify like elements, and in which:

FIGS. 9-11 indicate alternative methods of affixing and observing one or more code members relative to the gears of the meter;

FIGS. 12-15 illustrate a method and decoding apparatus for determining the existence and extent of tampering with a meter in accordance with one embodiment of the invention; and FIGS. 16-22 illustrate an alternate method and apparatus for decoding and determining the existence and extent of tampering in accordance with the invention.

DETAILED DESCRIPTION OF THE ILLUSTRATED EMBODIMENT

Figure 1:
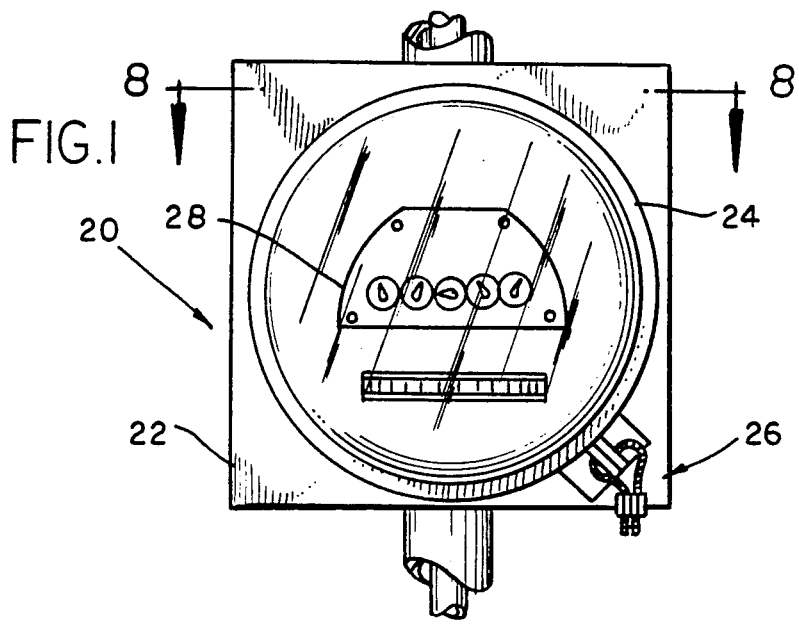
FIG. 1 is a simplified elevation showing a typical utility meter in connection with which the method and apparatus of the invention may advantageously be utilized.
Figure 2:
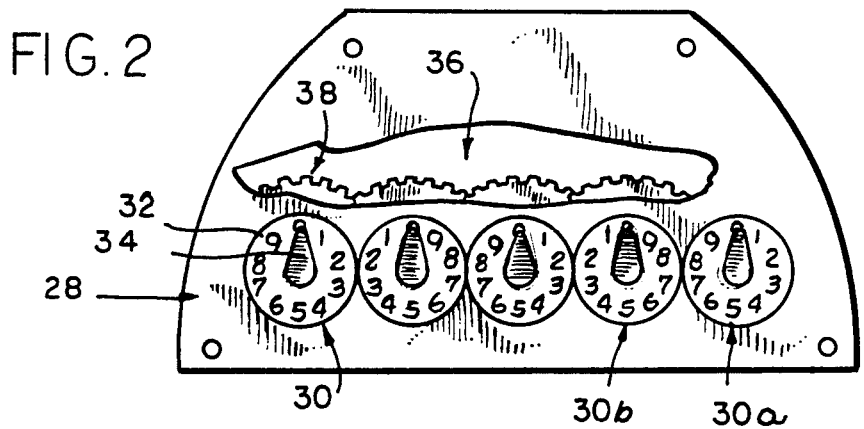
FIG. 2 is an enlarged view, partially broken away, of a face portion of the meter of FIG. 1, illustrating in further detail the dials thereof and some associated gears.
Figure 3:
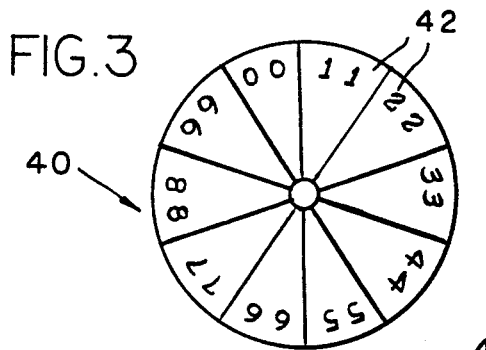
FIGS. 3-6 illustrate various alternate forms of coding means for association with the dials of the meter of FIG. 1 in accordance with the invention.

Referring now to the drawings and initially to FIGS. 1 and 2, there is illustrated a typical utility meter 20 of the type with which the method and apparatus of the invention may advantageously be utilized. This utility meter 20 includes a housing 22 and a transparent meter cover 24 attached thereto. Access to the meter is generally controlled by some locking or other antitampering seal, as indicated generally by reference numeral 26. Generally speaking, tampering with or breaking of the seal or locking device 26 will indicate some attempt to interfere or tamper with the proper operation and/or reading of the meter. However, there is no present method to determine the amount of tampering; i.e., how much the meter reading has been changed.

Referring also to FIG. 2, an indicator portion or face plate 28 of the meter includes a plurality of rotary dials 30, each of which includes on its face a plurality of angularly spaced and circumferentially arranged indicia 32. In the illustrated embodiment, these indicia comprise numbers. In this regard, successive ones of the dials 30 are preferably arranged (in an electric utility meter) to indicate kilowatt hour usage by powers of ten. That is, a first such dial 30a may indicate kilowatt hours, a second 30b tens of kilowatt hours, etc. As is generally also the practice, successive dials generally bear their indicia in clockwise and counterclockwise alternating fashion in order to simplify the gear train arrangement for driving the same. Associated with each set of indicia 32 is a rotary indicator 34 which takes the form of a pointer. The indicator and indicia are relatively rotatable. In the illustrated embodiment, it is the indicator or pointer 34 which is arranged for rotation relative to the indicia 32 which are affixed to the face 28 of the meter.

A suitable gear train, indicated generally by reference numeral 36, achieves the above-mentioned rotation of the dials in the above-described "powers of ten" fashion. Typically, such a gear train includes at least one gear 38 associated with each of the dials 30. In the typical meter illustrated, each of these gears 38 is substantially coaxially mounted with a shaft (not shown) upon which the dial or pointer 34 is mounted. The gears are also somewhat larger in diameter than the diameters defined by the indicia 32 of the dials 30. As mentioned hereinabove, these pointers 34 are frictionally mounted to their respective shafts, such that they may be manually rotated without rotating the gears 38. This feature permits the meter to be reset to zero for a new service connection. However, this also makes it possible for a customer to tamper with the meter reading.

In accordance with the present invention, and referring to FIGS. 3-6, encoding means are provided for encoding at least one of the gears 38 with a given code 40 which will correspond in predetermined fashion with the indicia 32 of its associated dial 30. In the illustrated embodiment these encoding means take the form of a decal or label which may be physically affixed to one or more of the respective gears 38. However, other encoding means, such as applying various markings, colorings, or the like directly to the gears might also be utilized without departing from the invention.

Generally speaking the coding means, or decals 40, comprise segmentation means for defining a plurality of separately identifiable and ascertainable angular segments 42 on a surface of the gear. In the illustrated embodiment this takes the form of visually segmenting the decals 40. Moreover, the segmentation defines a plurality of segments 42 which correspond in number and in angular spacing to the indicia 32 of the dial 30.

Figure 4:
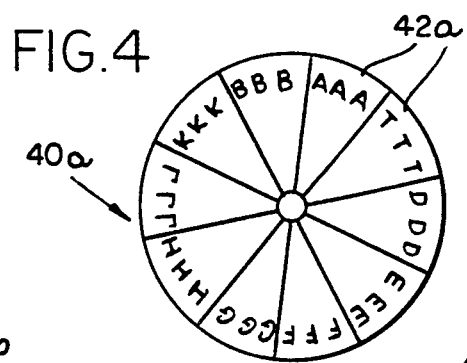
Figure 5:
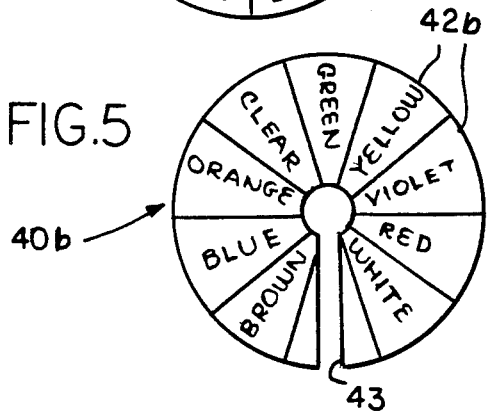
Figure 6:
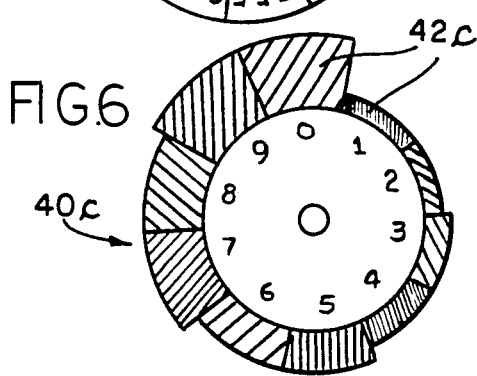

It should be recognized that encoding and differentiating this arrangement of segments 42 on the gear 38 may be done in any of a variety of fashions without departing from the invention. For example, as illustrated in FIG. 2, segments 42 are number coded. In FIG. 4 the segments 42a are illustrated as being letter coded. In FIG. 5 the segments 42b are color coded, and in FIG. 6 the segments 42c are shown with a pattern or scaled coding. Additionally, and as illustrated in FIG. 5, the code member or decal 40 may have a keyhole-shaped slot 43 therein which enables it to be readily slipped over and around the shaft associated with the gear 38 so as to be affixed to the gear 38 in the field, rather than upon initial manufacture and assembly of the meter.

Figure 7:
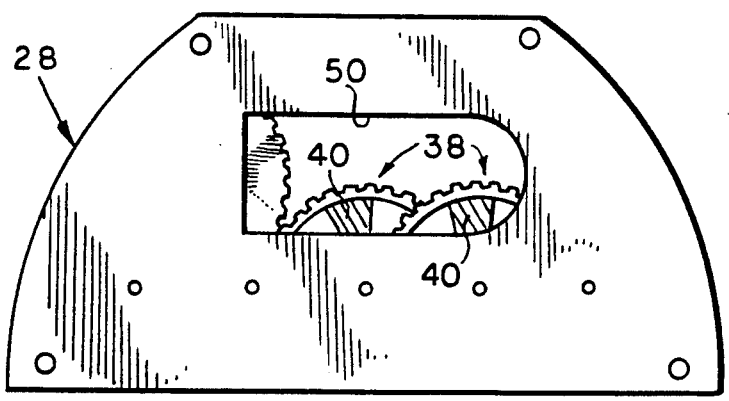
FIG. 7 illustrates one manner of affixation of a code of the type shown in FIGS. 3-6 with one of the gears of the meter shown in FIG. 2.
Figure 8:
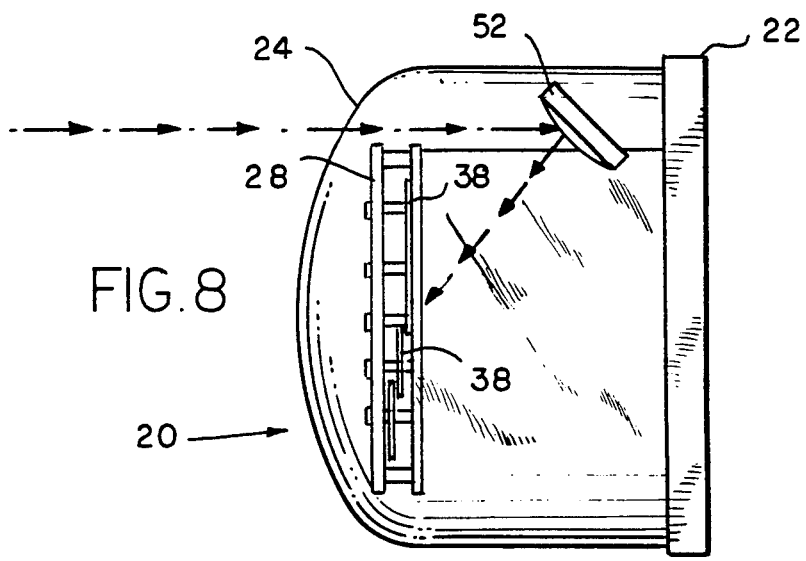
FIG. 8 illustrates a method of observing the codes affixed in the manner shown in FIG. 7.

Referring now also to FIGS. 7-11, the coding means such as the decals 40 may be applied to either the front or rear surface of one or more of the gears 38. As illustrated in FIGS. 7 and 8, the encoding means or decals 40 are affixed to the rear surface of one or more gears, whereby they may be viewed through an opening 50 by use of mirror 52 held in suitable orientation relative to the meter for observing the encoding means or decals. As will be more fully appreciated later herein, it is only necessary to read a single segment of the indicia or decal 40; and preferably that segment or portion thereof which is aligned with the zero indicia of the dial at the time of meter reading.

Figure 9:
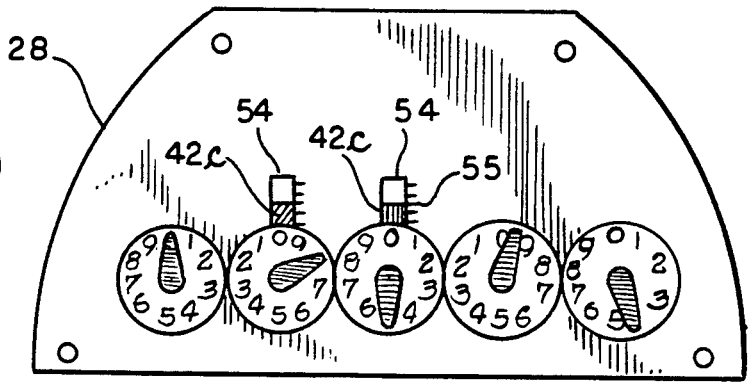
Figure 10:
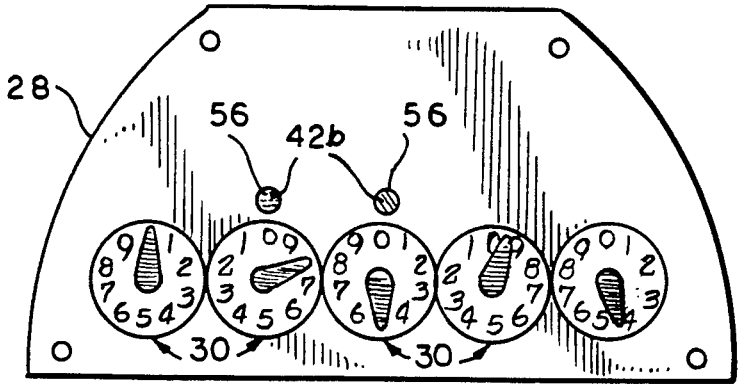
Figure 16:
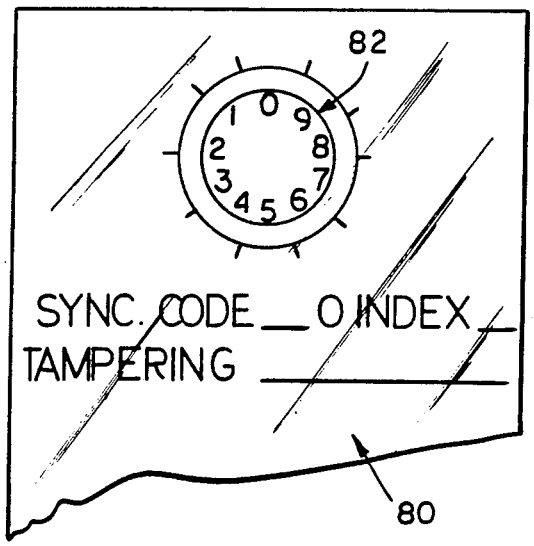

In FIGS. 9-11, various shaped and sized cutouts or through openings are provided in the face plate 28 of the meter to permit viewing of one or more of the indicia of the sort illustrated in FIGS. 3-6. Hence, in the embodiments of FIGS. 9-11, the indicia or decals 40 are affixed to the front surfaces of one or more of the gears 38, whereby they may be viewed through suitable openings 54, 56 or 58 which are provided in the face plate 28 of the meter. In the embodiment of FIG. 9, a further scale indicia 55 is provided in connection with an elongate opening 54 to permit visual observation of the relative height of the scaled or pattern coded segments 42c of the type shown in FIG. 6.

In FIG. 10, openings 56 may be of any desired shape, so long as they are oriented to expose a portion of the code segment 42b which is aligned with the zero indicia of the dial or dials 30. Finally, and referring to FIG. 11, similar openings 58 are arranged to expose that portion of the code 42 such as an alphanumeric (letter or number code) of the type shown in FIGS. 3 or 4, which is adjacent or aligned with the zero indicia of the dial or dials 30. The openings may be placed to view a code segment in alignment with some other segment of the indicia without departing from the invention.

Figure 12:
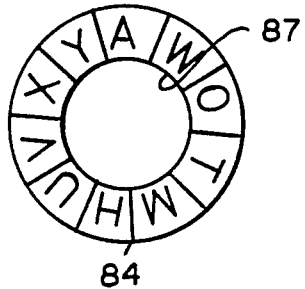

Thereafter, in accordance with the invention, and referring to FIG. 12, the initial coincidence between the code symbol or color or other indicia and the dial indicia is noted in some fashion upon the face of the meter itself. This memorialization is indicated in one exemplary form in reference numeral 60 in FIG. 12, wherein an indication of a month and year and the initial correspondence between the observed code segment and the indicia with which it is aligned is indicated. For example, in FIG. 12 the code T which appears in alignment with the zero dial indicia, when the indicator is also aligned with the zero dial indicia, is noted and will hereinafter be referred to as the sync code. Preferably, the key or sync code 60 is marked indelibly on some observable portion of the meter, such as on the face plate 28. Thus, if the indicator 34 is not tampered with, it will always be in alignment with the code letter T of the code markings or decal of its associated gear in the foregoing example. Hence observing the code marking or color currently exposed in the opening 58 will always enable one to ascertain the relative expected position of the indicator 40 by reference to the relative position of the sync code to the observed code at any given time.

Figure 15:
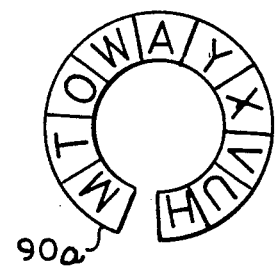

One method of ascertaining tampering is by use of a relatively simple meter reading or decoding card or member as illustrated in FIGS. 13-15. An alternative method, using a somewhat different form of reading or decoding card or member is illustrated in the following FIGS. 16-22.

Referring initially to FIG. 13, in accordance with the method of determining tampering and, if desired, simultaneously reading the meter shown in FIGS. 13-15, a decoding member 70 is provided. The decoding member 70 preferably includes a rectangular transparent card on which is imprinted or otherwise affixed a code 72 identical to the one which was affixed or applied to the gear 38. The method proceeds by initially observing the sync code 60 and by marking on the card an arrow or line indicating the segment of the code 72 which corresponds to that indicated by sync code 60. In the illustrated embodiment the sync code 60 indicates segment C and accordingly, a line or arrow 74 has been drawn to segment C of the code 72 on the card 70.

Thereupon the card 70 may be placed over the dial 30 which has been provided with the code 40 as illustrated in FIG. 14. The card is placed such that its code coincides with the code 42a visible through the opening 58 of the dial 32 to be read or checked for tampering. It will be noted that in the illustrated embodiment the second dial 30 from the left of the meter has been chosen to check for tampering, and it alone has been provided with the code 40 and window 58. In most meters, this dial reads the thousands of kilowatt hours and is the dial most likely to be tampered with in most instances. The next lower dials would not produce sufficient savings in apparent usage to warrant tampering while the next higher dial (ten-thousands of kilowatt hours) normally changes position so slowly that any tampering attempt would be immediately apparent by comparison with immediate past readings. However, the code members 40 of the invention may be utilized in connection with others or all of the dials, as desired, in any combination without departing from the invention.

Returning to FIG. 14, when the code 72 of the card is aligned with the code member 42a visible through window 58, the position of the dial 34 relative to the code segments of the card 72 is noted, and this position is marked with a line or arrow 76 as indicated in FIG. 15. By observing the difference between the expected position of the dial or indicator at line 74 and its actual observed position at line 76, the amount of tampering can be determined. In the illustrated embodiment, the dial has been moved back three segments, corresponding to three thousand kilowatt hours of actual usage which has not been properlhy recorded.

Referring now to FIGS. 16-22, an alternate method and related reading card or decoding card apparatus for carrying out the method of the invention is illustrated. A decoding member or card 80 has preprinted or otherwise affixed indicia 82 identical with the indicia of the dial 30 to be inspected for possible tampering. In the illustrated embodiment, the indicia consists of the numbers 0-9 running circumferentially in a counterclockwise direction. It will be noted that with some of the meter dials 30, as illustrated in FIG. 2, for example, the indicia run clockwise. Hence it is within the scope of the invention to provide clockwise numbers or indeed any other indicia identical with the dial indicia of the dial to be inspected for possible tampering.

Figure 17:
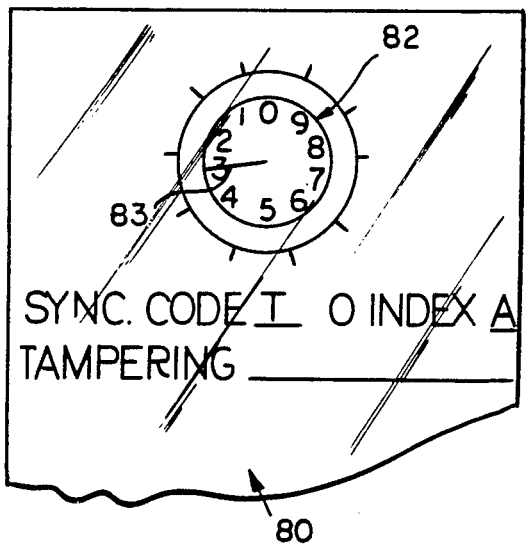
Figure 18:
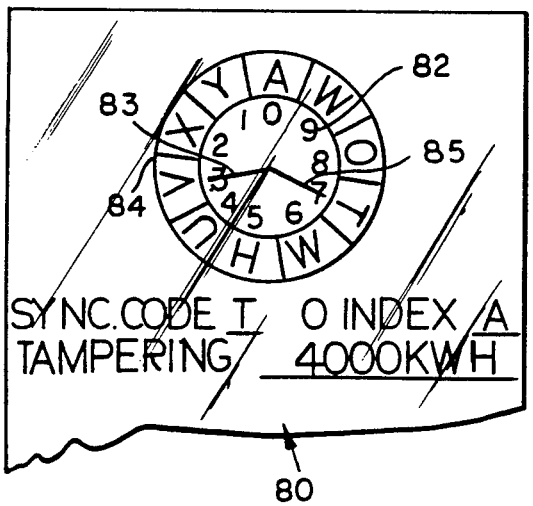

In order to detect tampering with the meter dial 30, the card or decoding member 80 is initially marked with a line coincident with the observed position of the indicator or pointer 34 of the dial 30 of interest. This is indicated in FIG. 17, wherein the observed position of the dial will be taken by way of example to be approximately at the numeral 3 thereof, and the corresponding numeral 3 of indicia 82 of the card 80 has been likewise marked with a radial line 83 corresponding to the pointer or indicator position of the dial being checked. Thereupon, an additional code label or decal 84 identical with the code associated with the dial to be checked is affixed to the decoding member or card 80. Preferably code member 84 has a transparent center portion 87. This latter decal 84 has a radial line 85 inscribed thereon, leading to the sync code which was observed on the meter. In the illustrated example, it is assumed that the meter sync code was the letter "T" and accordingly, a radial line has been inscribed from the center to the T segment of the decal or label 84. It will be remembered that the sync code is the letter observed in the opening or window 58 as in the example of FIG. 12, when the dial 30 has its indicator or pointer 34 initially set to the zero position.

Figure 20:
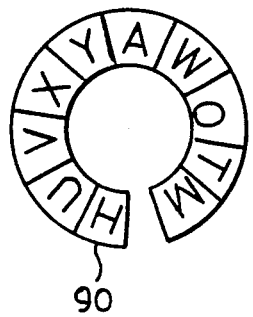
Figure 22:
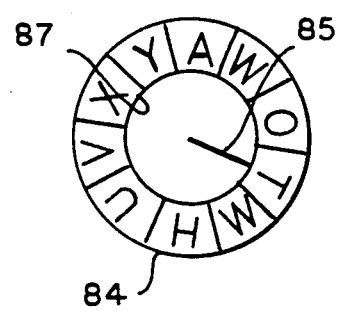

It will be noted that in the example of FIGS. 16-22, a somewhat different letter code sequence has been employed for encoding decals or members 90, 90a of FIGS. 19 and 20 and corresponding code member 84 (FIG. 21) to be used with decoding card 80. In accordance with the form of the invention shown in FIGS. 16-22, the code letters are preferably selected from those letters which appear the same in mirror image, such that code members or decals may be placed on either the front side or back side of the gears 38 and may be readily be read, either directly or by use of a mirror as described above with reference to FIG. 8. These letters are the capital letters A, M, W, 0, H, I, T, U, V, X and Y. FIGS. 19 and 20 show the arrangement of these letters to obtain an identical reading both directly and in mirror image.

Returning to the method, the label or decal 84 is affixed to the decoding member or card 80 in an orientation corresponding to the presently read zero index code on the dial 30 being checked. The zero index code is the letter or other code currently observed in the window 58 of FIG. 12, or otherwise in alignment with the zero indicia of the dial, as for example in the embodiments or examples of FIGS. 7-10. Thus, in the present example it is assumed that the zero index code; that is, the code currently aligned with the zero indicia of the dial of interest of the meter is the letter A. Accordingly, the letter A of the decal or label is placed in alignment with the zero index of the index marking 82 of the card when the decal or code member 84 is fixed thereto.

The amount of tampering, if any, may be determined by the amount of angular distance, if any, between the line 83 initially inscribed upon the card 80 and the line 85, which was inscribed upon the code member or decal 84. It will be further noted with respect to the cards or decoding members 70 and 80 as shown in FIG. 13 and in FIGS. 16-18, respectively, that additional spaces may be provided thereon to note other information such as the sync code, the zero index, and the amount of tampering, as well as the date, and whether or not tampering is indicated, if appropriate. The card 70 of FIG. 13 also includes a space for noting what the sync number is; that is, the number on the dial 30 which corresponds to the sync code if the window 58 is not aligned with the zero. That is, the windows 58 might be placed in alignment with some other portion of the dial without departing from the invention.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. Apparatus for use in detecting tampering with a dial of a utility meter of the type including at least one rotary dial having angularly spaced, circumferentially arranged indicia and an indicator, one of said indicia and said indicator being rotatable by a gear train having at least one gear which rotates in unison therewith in operation, said apparatus comprising:
   encoding means for superimposing upon said gear a code which corresponds in a predetermined fashion with said indicia of said dial;
   means for annotating upon a visible surface of the meter a predetermined key to a given initial correspondence of the code with the relative position of the indicator and indicia of the dial;
   means on said meter for permitting viewing of at least a predetermined portion of the code on said gear sufficient to ascertain the correspondence or non-correspondence of said viewed portion of said code with the observed relative position of said dial indicator and indicia in accordance with said key.

2. Apparatus according to claim 1 wherein said encoding means comprises segmentation means for defining a plurality of separately identifiable and ascertainable angular segments on a surface of said gear.

3. Apparatus according to claim 2 wherein said segmentation means define a plurality of segments which correspond in number and in angular spacing to the indicia of said dial.

4. Apparatus according the claim 1 wherein said encoding means comprises a plurality of color coded segments superimposed on a surface of said gear.

5. Apparatus according to claim 1 wherein said encoding means comprises a plurality of symbol coded segments marked upon a surface of said gear.

6. Apparatus according to claim 5 wherein said symbols are alphanumeric symbols.

7. Apparatus according to claim 1 wherein said encoding means comprises a plurality of pattern coded segments superimposed upon a surface of said gear.

8. Apparatus according to claim 1, wherein said encoding means are oriented on said gear for viewing through a transparent portion of said meter comprising said means for permitting viewing.

9. Apparatus according to claim 1, wherein said means for permitting viewing comprise a through opening in a face of said meter adjacent said dial and oriented for viewing a predetermined portion of said gear therethrough and wherein said encoding means are affixed to a surface of said gear which faces said through opening.

10. Apparatus according to claim 1 wherein said predetermined key to the correspondence of said code with the angular indicia of the dial is marked indelibly on an observable portion of the meter.

11. A method for use in detecting tampering with a dial of a utility meter of a type including at least one dial having angularly spaced, circumferentially arrayed indicia and an indicator, one of said indicator and said indicia being rotatable by a gear train having at least one gear which rotates in unison therewith in operation, said method comprising:
   encoding said gear with a code which corresponds in predetermined fashion with said indicia of said dial in such a manner as to permit viewing of a predetermined portion of said code from exteriorly of said meter;
   and annotating on said meter a predetermined key to a given initial correspondence of said code indicia; such that observation of said predetermined portion of said code is sufficient to determine the correspondence or non-correspondence between said predetermined portion of said code with the corresponding observed relative position of the indicator and indicia in accordance with said key.

12. A method according to claim 11 and further including the step of visually ascertaining the correspondence or non-correspondence between said code and the position of said indicator relative to the dial indicia thereof in accordance with said key.

13. A method according to claim 12 wherein said ascertaining includes providing a transparent decoding member bearing a code identical to the code on said gear; marking a portion of said decoding member code corresponding to the expected position of the indicator relative to its indicia in accordance with said key; aligning the code on said decoding member with the code on said gear and observing the actual position of the indicator relative to the marked position of its expected position.

14. A method according to claim 13 and further including marking said decoding member at a second position corresponding to the actual position of said dial and observing the angular difference between said expected and actual positions to determine the amount of tampering with said dial.

15. A method according to claim 12 wherein said ascertaining includes providing a decoding member bearing indicia corresponding to said dial indicia; providing a code member substantially identical to the code on said gear; marking said code member with a marking corresponding to the predetermined key annotated on said meter; aligning the code member with the decoding member in a manner identical to the observed alignment of the code on said gear with the indicia of said meter; marking the indicia on said decoding member in a manner corresponding to the observed relative position of the indicator and indicia of said dial; and observing the correspondence or non-correspondence between the marking on said decoding member and the marking on said code member affixed thereto.

16. A method according to claim 15 and further including the steps of entering on said decoding member data corresponding to the annotated key on said meter, and data corresponding to the observed relative position of the code of said gear with the indicia of said meter dial.

* * * * *

UNITED STATES PATENT AND TRADEMARK OFFICE
CERTIFICATE OF CORRECTION

PATENT NO. : 5,058,525

DATED : October 22, 1991

INVENTOR(S) : John F. Rilling

It is certified that error appears in the above-identified patent and that said Letters Patent is hereby corrected as shown below:

Column 8, Line 16 " a given initial correspondence of said code indicia;"

should read -- a given initial correspondence of said code with the relative position of said indicator and indicia; --

Signed and Sealed this

Twenty-third Day of March, 1993

Attest:

STEPHEN G. KUNIN

*Attesting Officer*     *Acting Commissioner of Patents and Trademarks*